(12) United States Patent
Turner

(10) Patent No.: US 6,227,494 B1
(45) Date of Patent: May 8, 2001

(54) DEPLOYABLE SPACECRAFT LANDER LEG SYSTEM AND METHOD

(75) Inventor: Ron D. Turner, Parker, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/333,569

(22) Filed: Jun. 16, 1999

Related U.S. Application Data
(60) Provisional application No. 60/089,408, filed on Jun. 16, 1998.

(51) Int. Cl.$^7$ ..................................................... B64G 1/00
(52) U.S. Cl. .................. 244/158 R; 244/100 R; 244/102 R; 244/102 A
(58) Field of Search ............... 244/158 R, 100 R, 244/102 R, 102 A

(56) References Cited

U.S. PATENT DOCUMENTS

| | | | |
|---|---|---|---|
| 3,164,222 | * | 1/1965 | Conrad ............................. 244/100 R |
| 3,175,789 | * | 3/1965 | Blumrich ......................... 244/100 R |
| 3,387,805 | * | 6/1968 | Barnett et al. ................... 244/100 R |

\* cited by examiner

*Primary Examiner*—J. Woodrow Eldred
(74) *Attorney, Agent, or Firm*—Marsh Fischmann & Breyfogle LLP

(57) ABSTRACT

A spacecraft is disclosed. In one embodiment the spacecraft includes a space travel vessel with landing gear. The landing gear include a plurality of landing leg assemblies. Each landing leg assembly includes a main leg assembly which is pivotally interconnected with the space travel vessel, and preferably two stabilizer leg assemblies. One end of each stabilizer leg assembly is pivotally interconnected with the space travel vessel, while the opposite end is pivotally interconnected, directly or indirectly, with its corresponding main leg assembly. Two stabilizer leg assemblies for each landing leg assembly preferably defines an A-frame stabilizing structure. Both the main leg assembly and its corresponding stabilizer leg assembly(ies) are extendable via telescoping action. During the initial portion of deployment of the landing gear, both the main leg assembly and its stabilizer leg assembly(ies) extend such that the only substantial relative movement between the main leg assembly and space travel vessel is along an at least substantially linear or axial path. "Latching" the stabilizer leg assembly (ies) before their corresponding main leg assembly introduces a second stage of deployment where the main leg assembly continues to extend, but simultaneously with a pivoting of the main leg assembly relative to the space travel vessel.

37 Claims, 10 Drawing Sheets

DEPLOYABLE SPACECRAFT LANDER LEG SYSTEM AND METHOD

CROSS-REFERENCE TO RELATED APPLICATIONS

This application is a utility patent application of provisional patent application Ser. No. 60/089,408, filed Jun. 16, 1998, and entitled "DEPLOYABLE SPACECRAFT LANDER LEG SYSTEM", the entire disclosure of which is hereby incorporated by reference in its entirety herein.

FIELD OF THE INVENTION

The present invention generally relates to the field of spacecraft and, more particularly, to landing gear for spacecraft.

BACKGROUND OF THE INVENTION

The assignee of the subject patent application has previously used the type of landing gear design which is illustrated in FIGS. 5A–5B and which is admitted to be prior art to the subject patent application. FIGS. 5A–5B generally depict a spacecraft 200 which includes a space travel vessel 204 and landing gear 228 therefore. The space travel vessel 204 is defined at least in part by a back panel 212 which is disposed about a central reference axis 214. A heat shield 208 is interconnected with the back panel 212 and projects in the direction which the spacecraft 200 travels when descending upon a planetary surface (at least generally in the direction of the reference axis 214). Part of the back panel 212 includes at least one instrument deck 216. The instrument deck 216 is movably interconnected with the back panel 212 via a deck pivot 224. Deployment of the instrument deck 216 thereby entails pivoting a top edge 220 of the instrument deck 216 about the deck pivot 224, typically to where the instrument deck 216 is at least generally horizontally disposed.

Three landing leg assemblies 230 are radially spaced about the central reference axis 214 (only one shown in FIGS. 5A–B) and define the landing gear 228. Each landing leg assembly 230 includes a main leg assembly 232 which is movably interconnected with the space travel vessel 204 via a main leg pivot 244. Components of the main leg assembly 232 include an outer tube 236 and an inner tube 240. The outer tube 236 is disposed about the inner tube 240 in the stowed position. A foot pad assembly 264 is pivotally interconnected with a distal end of the inner tube 240. When the landing gear 228 is deployed, an appropriate biasing member (not shown) is allowed to act on the inner tube 240 in a such a way so as to move the inner tube 240 axially within and out of the outer tube 236 from the position illustrated in FIG. 5A to the position illustrated in FIG. 5B where a latch initially fixes the position of the outer tube 236 relative to the inner tube 240. Engagement of the foot pad assemblies 264 on the planetary surface on which the spacecraft 200 lands exposes each main leg assembly 232 to a compressive force. Forming a portion of the main leg assembly 232 from a crushable material dampens this impact to a degree, although compaction of the main leg assembly 232 is limited so as to continue to dispose the space travel vessel 204 above the subject planetary surface.

Another part of each landing leg assembly 230 is an A-frame 252 which is defamed by a pair of stabilizers 256 (only one shown). Each stabilizer 256 is pivotally interconnected with the space travel vessel 204 at a stabilizer pivot 260, and is fixedly interconnected with the corresponding foot pad assembly 264 so that the relative position between each stabilizer 256 and its corresponding foot pad assembly 264 does not change in moving from the stowed position of FIG. 5A to the deployed position of FIG. 5B. Unlike the main leg assembly 252 which telescopes when moving from the stowed position to the deployed position, the plurality of stabilizers 256 are of fixed length (i.e., no extension capabilities whatsoever). Therefore, throughout the entirety of the time in which each main leg assembly 232 is extending, each main leg assembly 232 is also pivoting relative to the space travel vessel 204 about its corresponding main leg pivot 244. Based upon the fixed length of the stabilizers 256, together with the need to dispose the space travel vessel 204 a certain predetermined distance "$h_1$" above the planetary surface on which the spacecraft 200 is disposed, each main leg pivot 244 is disposed vertically beyond (at a higher elevation) the instrument deck 216 when deployed (i.e., the instrument deck 216 is located at an intermediate location between the planetary surface on which the spacecraft 200 is disposed and the elevation where the various main leg pivots 244 are disposed). Moreover, the main leg assembly 230 is disposed at an angle θ, which is measured relative to vertical and which is about 25°.

BRIEF SUMMARY OF THE INVENTION

The present invention generally relates to landing gear for spacecraft. A first aspect of the present invention is directed to a spacecraft which includes a space travel vessel and landing gear which is interconnected with this space travel vessel. The landing gear includes a plurality of landing leg assemblies, and in one embodiment three of such landing leg assemblies are utilized which are radially spaced about a vertical reference axis. Preferably each of these landing leg assemblies includes a first leg assembly and at least one second leg assembly. The first leg assembly may be characterized as the main leg assembly, is movably interconnected (e.g., pivotally) with the space travel vessel, and includes first and second legs which are interconnected in a manner which allows the first leg assembly to telescope (e.g., to extend). The second leg assembly may be characterized as a stabilizer for the first leg assembly, is also movably interconnected with the space travel vessel (e.g., pivotally) although at a different location than the first leg assembly, includes third and fourth legs which are interconnected in a manner which allows the second leg assembly to telescope (e.g., to extend), and is further interconnected (e.g., pivotally) with the first leg assembly (directly or indirectly). Preferably each landing leg assembly includes two second leg assemblies which are pivotally interconnected with the space travel vessel at spaced locations, but which each interconnect with the first leg assembly at least at the same general location to define an A-frame configuration (when considering only the second leg assemblies) or a tripod configuration (when considering the first leg assembly in combination with the two second leg assemblies).

Various refinements of the above noted features of the first aspect of the present invention are contemplated, as well as the inclusion of additional features. These refinements and additional features may be employed in any combination. The lower or leading portion of the space travel vessel may include a heat shield or the like to protect the space travel vessel when entering a planet's atmosphere. One way to characterize the general configuration of the space travel vessel is as a frustum with an acute angle between its sidewall and bottom. Being characterized as the "bottom" should not be confused with directional travel since the bottom of the space travel vessel as defined is actually the leading portion of the space travel vessel at least on its descent to a planetary surface. Storage of the landing leg assemblies within this type of space travel vessel may be such that each first leg assembly is disposed in a position which may be characterized as being one or more of being at least generally parallel with the sidewall of the space travel vessel or at least generally proximate the sidewall of the space travel vessel, and further such that the second leg assembly is disposed in a position which may be characterized as being one or more of being at least generally parallel with the bottom of the space travel vessel or at least generally proximate the bottom of the space travel vessel.

Pivotal interconnection of the first leg assembly and the space travel vessel may be through a first pivotal connector. In one embodiment the first pivotal connector is a spherical bearing assembly which accommodates movements of the first leg assembly relative to the space travel vessel other than the telescoping action provided by the noted interconnection of the first and second legs of the first leg assembly (e.g., a sliding-like action between the first and second legs). Deployment of the first leg assembly may involve first utilizing at least substantially only linear or axial movement of the first leg assembly relative to the space travel vessel through extension of the first leg assembly (e.g., axial movement of the second leg relative to a positionally fixed first leg), followed by continued extension of the first leg assembly simultaneously with a pivoting of the first leg assembly about the space travel vessel. Use of the noted spherical bearing assembly facilitates this type of deployment of the first leg assembly. Preferably this "second stage" movement of the first leg assembly entails a pivoting of the first leg assembly to move its distal or lowermost end back toward a perimeter of the space travel vessel or to a position which is disposed more directly "under" the space travel vessel. That is, the angle between the first leg assembly during the first stage deployment and measured relative to vertical will be greater than the angle of the first leg assembly when fully deployed and again measured relative to vertical.

Where the first pivotal connector between the space travel vessel and first leg assembly may be positioned is subject to a number of characterizations. The first pivotal connector may be described as interfacing with an intermediate portion of the first leg assembly prior to deployment of the same or when in its stowed position. Another way involves defining the first leg assembly as having first and second ends. In this case the first end of the first leg assembly is that which is closest the space travel vessel in the deployed position and the second end of the first leg assembly is interconnected with a landing foot assembly (e.g., for interfacing with a planetary surface on which the space travel vessel is disposed). Prior to deployment of the first leg assembly or when the first leg assembly is in a stowed position, the first pivotal connector in the subject example may then be described as interfacing with the first leg assembly at a location which is closer to the end of the first leg assembly proximate the landing foot assembly (i.e., the defined second end) than to the end of the first leg assembly which is closest to the space travel vessel in the deployed position (i.e., the defined first end). Yet another way to characterize the position of the first pivotal connector is that prior to deployment of the first leg assembly or when the first leg assembly is in its stowed position, one end of the second leg of the first leg assembly is disposed on one side of the first pivotal connector, and that after deployment of the first leg assembly, this same end of the second leg is disposed on the opposite side of the first pivotal connector by the telescoping action of the first leg assembly (i.e., the second leg is effectively entirely drawn through the first pivotal connector when moving the first leg assembly from the stowed position to the deployed position).

Telescoping of each of the first and second leg assemblies may be realized through a biasing member such as a coil spring or the like. One end of the biasing member associated with the first leg assembly may be fixed or retained in at least some respect relative to its first leg, while the opposite end of the biasing member associated with the first leg assembly may be fixed in at least some respect relative to its second leg. Compression of the biasing member associated with the first leg assembly when in its stowed position may then be used to extend or deploy the first leg assembly at the appropriate time via an expansion or extension of the biasing member. In this regard, an appropriate device may be used to retain the first leg assembly in its stowed position until deployment is desired, at which time an appropriate signal may be sent to this device to allow the "stored" compressive forces of the biasing member to telescope or extend the first leg assembly. The second leg assembly may have its own biasing member, with one biasing member end acting on the third leg and the opposite biasing member end acting on the fourth leg such that compression of the biasing member associated with the second leg assembly may be used to telescope the same in a similar manner to that described for the first leg assembly.

Both the first leg assembly and second leg assembly of each landing leg assembly may include a latch or the like to retain the first and second leg assemblies, respectively, in their fully deployed position so as to dispose the space travel vessel above a planetary surface on which the spacecraft is disposed. The latch associated with the second leg assembly may be activated or engaged prior to the latch associated with the first leg assembly. This affects the manner in which the landing leg assembly is deployed, and may be used to produce the movement of the first leg assembly noted above. That is, as both the first and second leg assemblies extend, the relative movement between the first leg assembly and a space travel vessel may be limited to being along an axial or linear path. However, once the second leg assembly latches, the first leg assembly will continue to extend, but will also pivot relative to the space travel vessel. Once again, using a spherical bearing assembly and above noted positioning of the same relative to the first leg assembly, facilitates this multi-dimensional movement.

The landing gear may further include a sensor which in effect monitors the position of the first leg assembly and which is operatively interconnected with at least one thruster which controls the rate of descent of the space travel vessel toward a planetary surface. One way to sense the position of the first leg assembly is to have a first sensor part which is maintained in a stationary position and a second sensor part which is movable in response to the engagement between the landing gear and the planetary surface on which the spacecraft is descending. For instance, the first sensor part could be fixed to the above-described first pivotal connector, and the second sensor part could be movably interconnected with the first pivotal connector in response to the second leg assembly. Engagement of the landing gear on the planetary surface will expose the first leg assembly to compressive forces and cause the second leg (which passed through the first pivotal connector in a first direction) to move back towards the first pivotal connector or in a second direction which is opposite the first direction. The second sensor part may be interconnected with or responsive to movement of the second leg in the second direction (e.g., the second leg or structure interconnected therewith may engage the second sensor part when moving in the noted second direction to advance the same at least generally toward the first sensor part). The change in relative position between the first and second sensor parts or the realization of a certain relative positioning between the first and second sensor parts may generate a signal which in turn may be used to control the thruster(s) associated with the spacecraft (e.g., to terminate operation of the thruster(s)).

Another feature associated with the engagement of the landing gear on a planetary surface which exposes the first leg assembly to compressive forces is the inclusion of a crushable portion in each first leg assembly. One desirable configuration for this crushable portion is to increase the thickness of the crushable portion as the same progresses in the direction of a distal end of the first leg assembly (e.g., in a direction of a landing foot assembly). Consider the situation where the crushable portion is in the form of a tube having a wall thickness. The wall thickness of the crushable portion may progressively increase between points A and B, with point B being between point A and the distal end of the first leg assembly. Therefore, as the crushable portion crushes during engagement of the landing gear on the planetary surface, progressively increased resistance to crushing is encountered due to the increasing "robustness" in the direction of the distal end of the first leg assembly, and thus increased damping, by the increasing wall thickness of the crushable portion in the direction of the distal end of the first leg assembly.

The pivotal interconnection between the first and second leg assemblies may be established by having one end of the second leg assembly pivotally attached to part of the first leg assembly or by having the first and second leg assemblies attached to a common structure. One appropriate "common structure" is a landing foot or landing foot assembly which may be included with the landing gear and which would interface with the surface on which the spacecraft lands when the landing gear is deployed. Both the first and second leg assemblies may be pivotally interconnected with this landing foot or landing foot assembly. Moreover, a lower surface of the land foot or landing foot assembly may be at least generally spherically-shaped. This increases the stability of the spacecraft when disposed on uneven planetary surfaces. Further increases in stability may be realized by a certain interface between the second leg assembly and the landing foot assembly. Consider the situation where the third leg of the second leg assembly is pivotally interconnected with the space travel vessel and where the fourth leg of the second leg assembly is interconnected with the landing foot assembly. One part of the fourth leg (e.g., a tube) may be pivotally interconnected with the landing foot assembly, while another part of the fourth leg (e.g., an internal guide rod disposed within the tube) may interface with a "mouth" of an aperture formed in the landing foot assembly. Application of compressive forces to the landing gear upon contacting a planetary surface may "drive" the end of the internal guide rod into this aperture to further stabilize the spacecraft on the planetary surface. Appropriate contouring of this aperture in the landing foot assembly allows for the noted action regardless of the position of the landing foot assembly (e.g., due to the contour of the underlying planetary surface) relative to the fourth leg.

Another attribute of the landing gear associated with the subject first aspect is its position relative to one or more instrument decks which may be incorporated into the design of the spacecraft. Instrument decks are often deployed for various purposes when the spacecraft is disposed on a planetary surface. One way to characterize this relative positioning is that due to the noted configuration of the landing leg assemblies of the spacecraft, all portions of the landing leg assemblies may be positioned relative to the space travel vessel so as to be at a lower elevation than all portions of each instrument deck, at least when the landing gear and instrument deck(s) are each in their fully deployed positions (i.e., all portions of the landing gear will be disposed closer to the planetary surface on which the spacecraft is disposed than the instrument deck(s)). Another way to characterize this relative positioning is that the above-noted first pivotal connector between the first leg assembly and the space travel vessel, as well as the pivotal connector between the second leg assembly and the space travel vessel, may all be disposed at a lower elevation (relative to a planetary surface on which the spacecraft is disposed) than a pivotal connector used to deploy the instrument deck.

A second aspect of the present invention is directed to a method for deploying landing gear from a space travel vessel of a spacecraft. This landing gear includes a first leg assembly which is interconnected with the space travel vessel. The method includes extending the first leg assembly. At least at some point in time during this extension of the first leg assembly, the only substantial relative movement between the first leg assembly and space travel vessel is linear or axial movement. There is also a pivoting of the first leg assembly relative to the space travel vessel at least at some point in time during the deployment of the landing gear, however.

Various refinements of the above noted features of the second aspect of the present invention are contemplated, as well as the inclusion of additional features. These refinements and additional features may be employed in any combination. The extension of the first leg assembly may entail directing the first leg assembly through a spherical bearing assembly of the type discussed above in relation to the first aspect of the present invention and which accommodates the multiple types of movement of the first leg assembly relative to the space travel vessel in accordance with the subject second aspect. Extension of the first leg assembly may be affected through a biasing member of the type discussed above in relation to first aspect of the present invention as well.

Timing considerations may exist in relation to the subject second aspect of the present invention. For instance, the time where the only substantial relative movement between the space travel vessel and the first leg assembly is along an at least substantially axial or linear path may be during the initial deployment of the landing gear. The pivoting of the first leg assembly relative to the space travel vessel may be undertaken some time thereafter. The pivoting of the first leg assembly may also be characterized as being undertaken as the first leg assembly continues to extend, in which case the first leg assembly will be both moving axially (relative to itself) and pivotally (relative to the space travel vessel). The direction of the noted pivotal motion may be such as to direct a lowermost extreme of the first leg assembly in a direction toward "underneath" the space travel vessel, although the amount of pivoting need not be of a magnitude which actually disposes this lowermost extreme of the first leg assembly underneath the space travel vessel when it is disposed on a planetary surface. Typically the distal end of the first leg assembly will in fact be disposed beyond a perimeter of the bottom of the space travel vessel when disposed on a planetary surface. The movement of the first leg assembly relative to the space travel vessel may also be characterized as first moving away from the space travel vessel at a first angle relative to vertical, and through the noted pivoting of the first leg assembly having the first leg assembly actually end up being disposed at a second angle relative to vertical which is of a lesser magnitude than the noted first angle.

The landing gear associated with the subject second aspect may include at least one second leg assembly which is interconnected with the first leg assembly, and which is also interconnected with the space travel vessel at a location which is displaced from where the first leg assembly is interconnected with the space travel vessel. As in the case of the first aspect discussed above, the first leg assembly may be characterized as a main leg assembly and the second leg assembly may be characterized as a stabilizer for the main leg assembly. Furthermore, each leg assembly of the landing gear in the subject second aspect may include a number of second leg assemblies similar to the first aspect discussed above.

Deployment of the landing gear in accordance with the subject second aspect may entail extending each second leg assembly during at least a portion of the deployment of the landing gear. Extension of each second leg assembly may be through the type of biasing member discussed above in relation to the first aspect. The time during deployment of the landing gear in which the only significant relative movement between the space travel vessel and the first leg assembly is at least substantially axial or linear may coincide with the time at which the second leg assembly is also extending along a linear or axial path or telescoping. Terminating the extension of the second leg assembly, such as by activating a latch associated with the second leg assembly, may be used to initiate the pivoting of the first leg assembly relative to the space travel vessel. Continued extension of the first leg assembly with its associated second leg assembly(lies) being "latched" will then cause the first leg assembly to also pivot relative to the space travel vessel. During extension of the second leg assembly, the second leg assembly may also pivot relative to the space travel vessel. Pivotal motion will also exist between the second leg assembly and the space travel vessel after the second leg assembly "latches" and while the first leg assembly continues to deploy.

DETAILED DESCRIPTION OF THE INVENTION

A spacecraft lander leg system is disclosed which accommodates compact stowage during transport and effective impact absorption during landing, and which is otherwise particularly apt for providing enhanced ground clearance and a clear field of view from an instrument deck after landing.

Figure 1A:
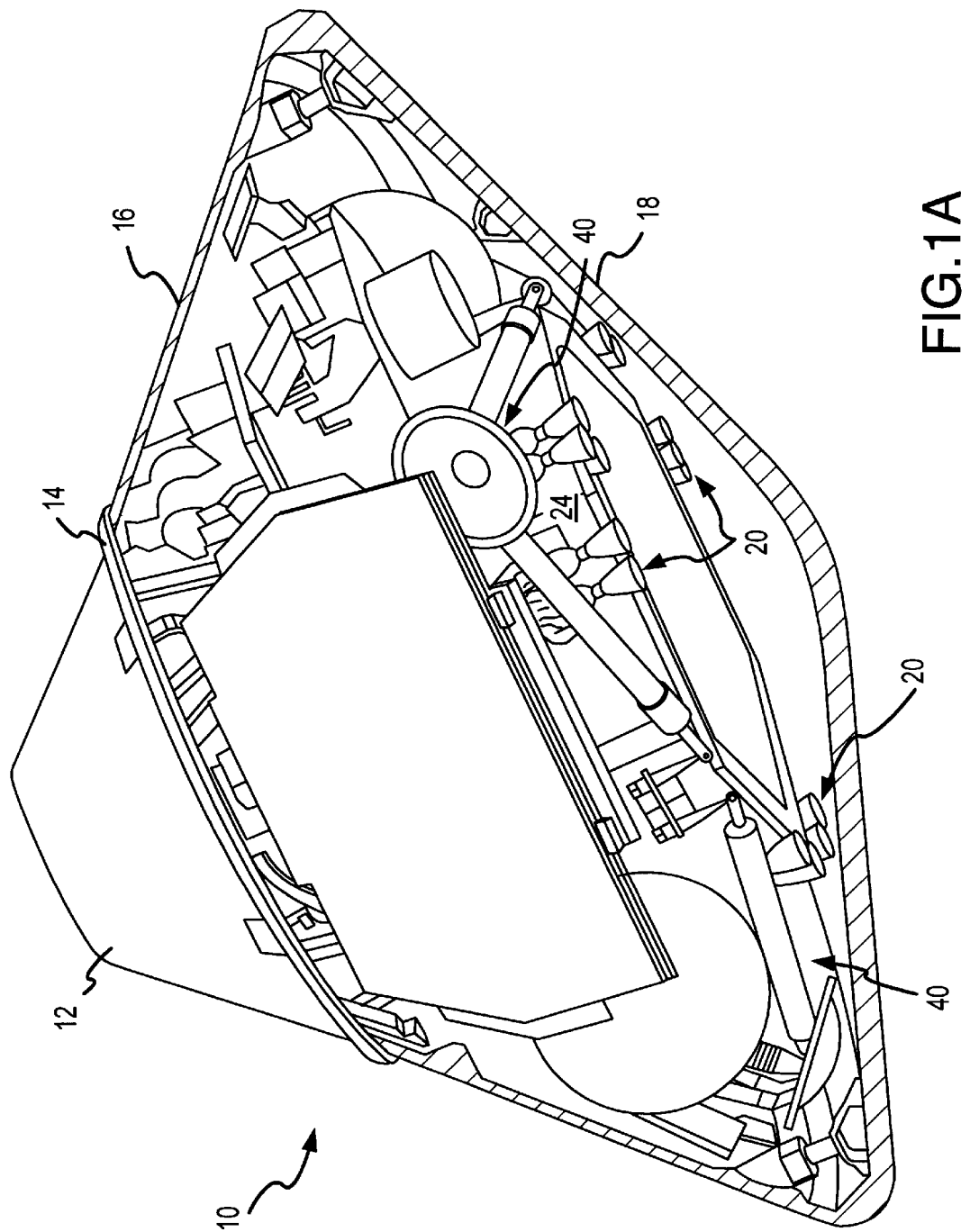
FIG. 1A is a perspective, cutaway view of a spacecraft with landing gear in a stowed position.
Figure 1B:
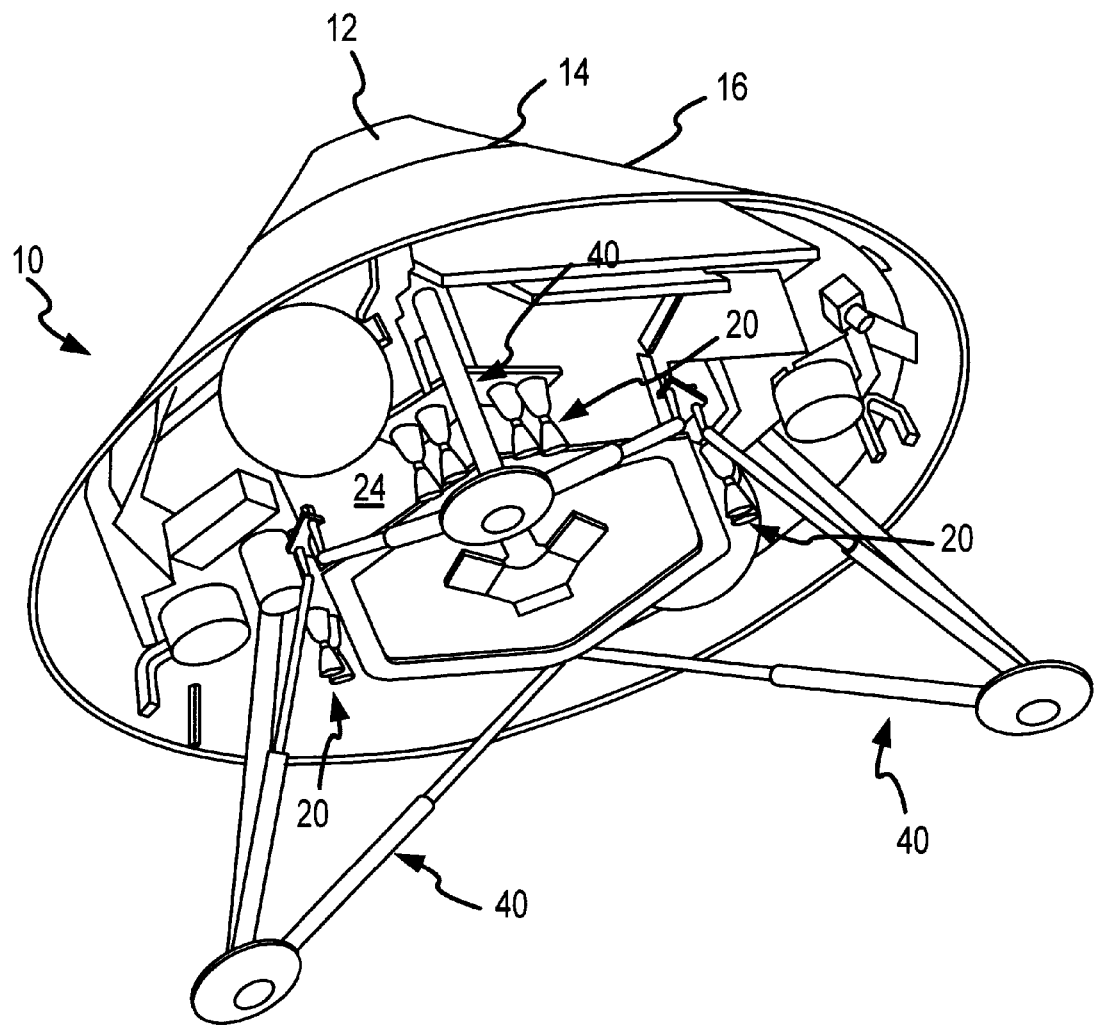
FIG. 1B is a perspective view of the spacecraft of FIG. 1A on a descent toward a planetary surface, with its landing gear in a fully deployed position, and with the spacecraft's heat shield having been jettisoned.
Figure 1C:
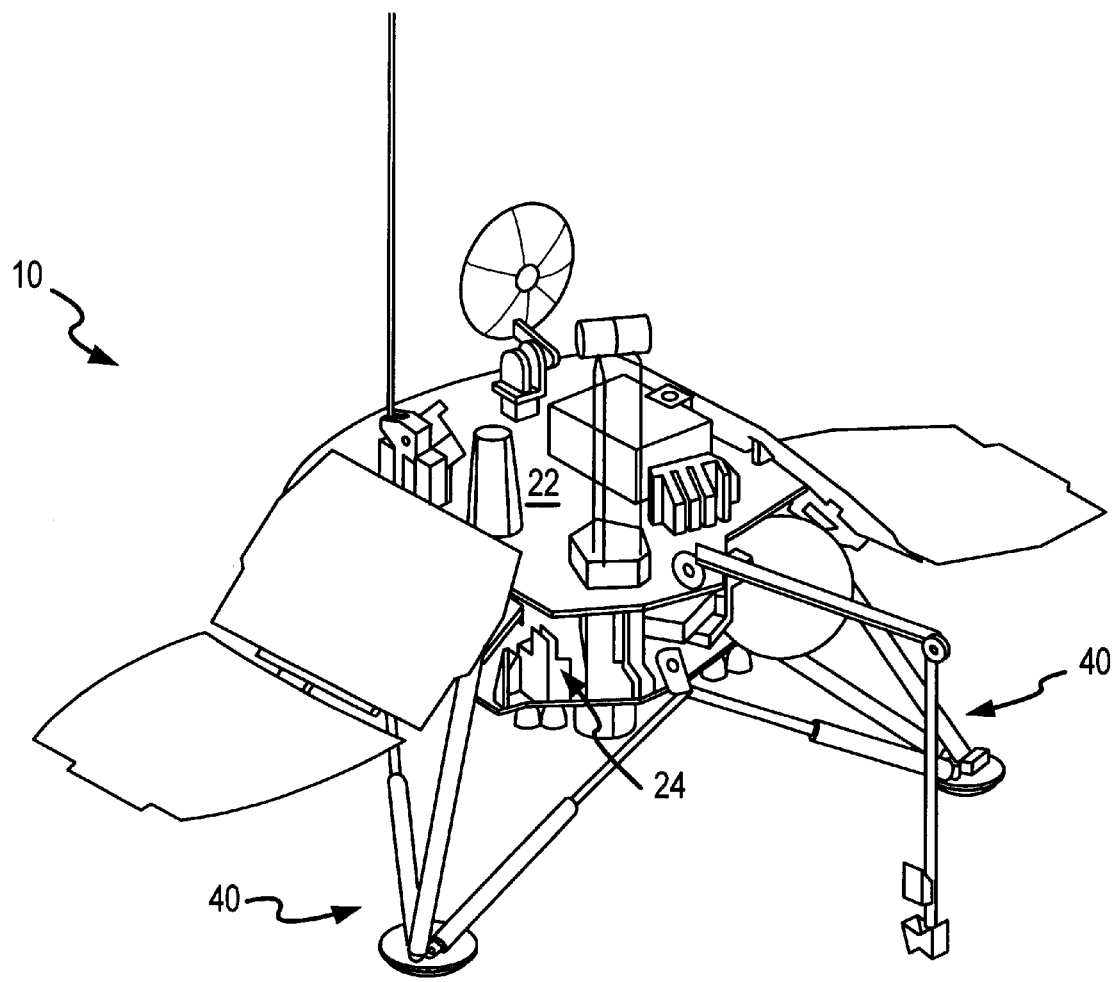
FIG. 1C is a perspective view of the spacecraft of FIG. 1A when disposed on a planetary surface, with its instrument deck and certain scientific apparatus in a deployed position, and with the spacecraft's parachute cone and back panel having been jettisoned.

FIGS. 1A–1C, 2A–2C, 3A–3B, and 4A–4B pertain to one embodiment of the present invention. More particularly, FIG. 1A illustrates a spacecraft 10 having three lander leg assemblies 40 in a stowed position (two visible), and FIGS. 1B and 1C illustrate the lander leg assemblies 40 in a deployed position.

As shown in FIG. 1A, upon entry into an atmosphere of a planet, the spacecraft 10 includes a parachute cone 12, a back shell/cruise ring 14, a back shell 16, and a heat shield 18. After chute deployment, the heat shield 18 may be jettisoned as the spacecraft 10 descends. The lander leg assemblies 40 may then be sequentially deployed from the stowed position to a deployed position as shown in FIG. 1B. The parachute cone 12 and back shell 16 may then be jettisoned from the spacecraft 10, and various thrusters (e.g., 20) may be utilized to facilitate spacecraft 10 landing. Upon landing, various instruments and devices supported on instrument deck 22 may be utilized to conduct scientific experiments, collect solar radiation, communications, etc., as illustrated in FIG. 1C. In this regard, it should be noted that each of the lander leg assemblies 40 are positioned entirely below the instrument deck 22 after landing, thereby allowing a full field of view about instrument deck 22 for various instruments mounted thereupon.

Figure 2A:
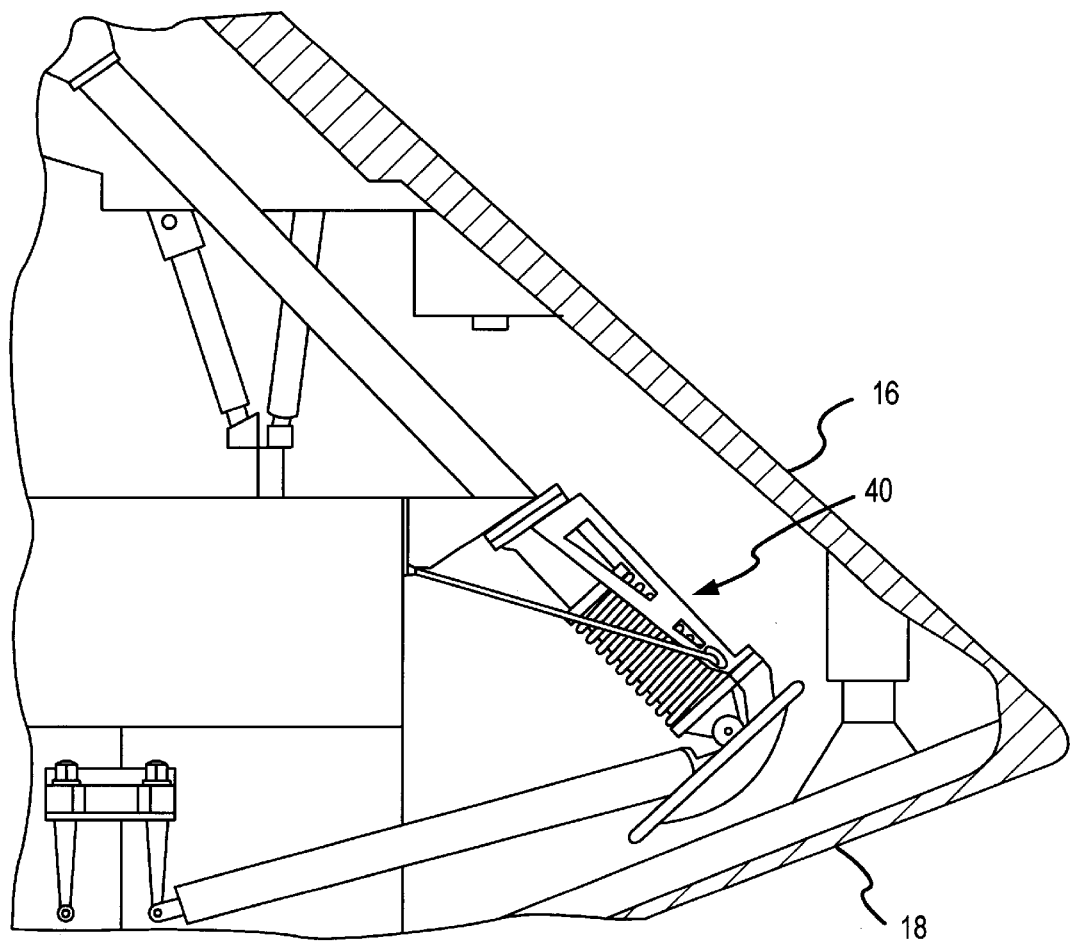
FIG. 2A is a cutaway side view of one landing leg assembly from the spacecraft of FIG. 1A in its stowed position within the space travel vessel.
Figure 2B:
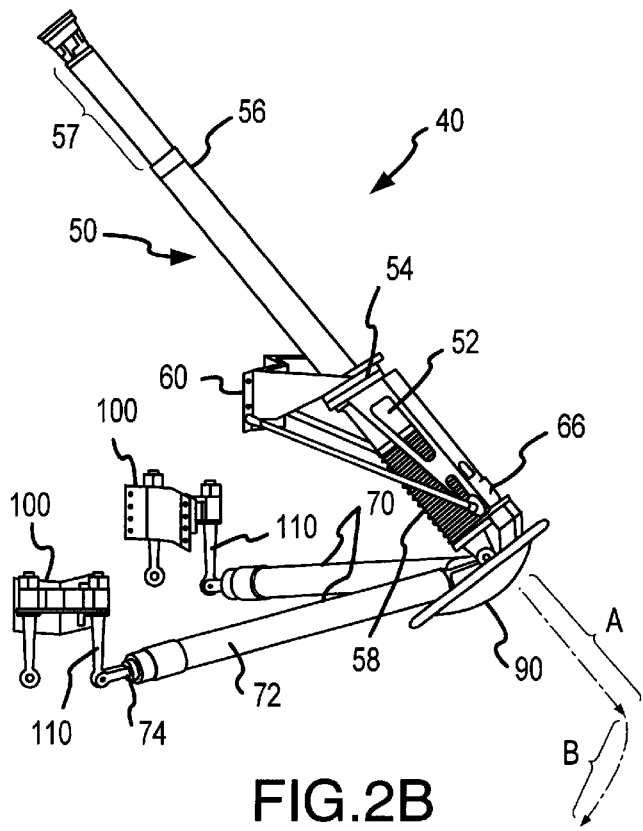
FIG. 2B is a perspective view on one landing leg assembly from the spacecraft of FIG. 1A in its stowed position.
Figure 2C:
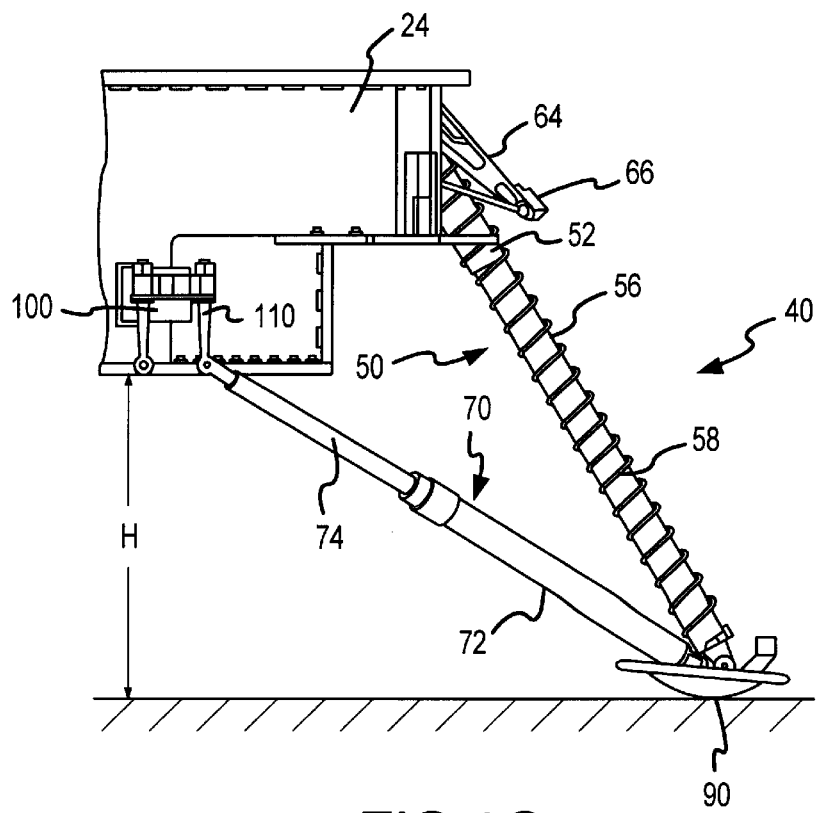
FIG. 2C is a side view on one landing leg assembly from the spacecraft of FIG. 1A in its deployed position and with the space travel vessel being disposed on a planetary surface.

FIGS. 2A and 2B illustrate an exemplary one of the lander leg assemblies 40 in a stowed position, while FIG. 2C illustrates the exemplary lander leg assembly 40 in a fully deployed position. As shown in the partial cutaway view of FIG. 2A, the lander leg assembly 40 may be compactly stowed within the spacecraft 10 with portions of the assembly positioned immediately adjacent to the back shell 16 and heat shield 18 of the spacecraft 10.

As best shown in FIGS. 2B and 2C, the exemplary lander leg assembly 40 comprises a downwardly extendable main support leg assembly 50 and two telescoping stabilizing leg assemblies 70. The main support leg assembly 50 is mounted to a support structure 24 within the spacecraft 10, via a corresponding leg mount bracket assembly 60 (also see FIGS. 1A–1C), and is pivotably interconnected at its bottom end to a foot pad assembly 90. Each stabilizer leg assembly 70 is pivotably connected at a first, or upper, end to a corresponding load-limiter bracket 100 via a tapered, deflectable member 110. Each stabilizer leg assembly 70 is pivotably connected at its second, or lower, end to the foot pad assembly 90. As will be appreciated, the main leg assemblies 50 will absorb axial, compressive loads upon landing, while the stabilizer leg assemblies 70 will absorb moment loads to facilitate operation of the main leg assemblies 50 upon touchdown. The stabilizer leg assemblies 70 may also absorb axial, compressive loads upon landing.

Main leg assembly 50 comprises a leg support tube 52, interconnected at one end to the mount bracket 60 via a spherical bearing assembly 54, a main leg 56 slidably extending through both said spherical bearing assembly 54 and leg support tube 52, and a compression spring 58 that is utilized for deployment. Compression spring 58 is retained at one end by a restraining flange on the leg support tube 52 and is interconnected at its other end to the bottom end of the main leg 56 or to a fitting interconnected thereto. The main leg 56 includes an upper crushable portion 57 (e.g., comprising an aluminum honeycomb structure for crushable, impact load absorption) and a lower portion extending downwardly therefrom.

A leg separation attachment bracket 64 is interconnected at one end to the leg mount bracket 60 (e.g., via attachment to bearing assembly 54). For purposes of deploying a lander leg assembly 40, the bracket 64 may be selectively caused to disengage at its other end from the main leg assembly 50 via a separation nut assembly 66. As will be appreciated, the leg separation attachment bracket 64 and separation nut assembly 66 serve to maintain the compression spring 58 in a compressed state during stowage and transport. Upon deployment, the compression spring 58 is free to lengthen and exert its resilient force, thereby causing the main leg member 56 to be drawn through the spherical bearing assembly 54/leg support tube 52 and downwards into a deployed position, as will be further described.

Each stabilizer leg assembly 70 comprises a lower tube member 72 and an upper tube member 74. The upper tube member 74 is positioned substantially within the lower tube member 72 during stowage. The lower tube member 72 then telescopes about and outwardly/downwardly away from the upper tube member 74 upon deployment.

Figure 3A:
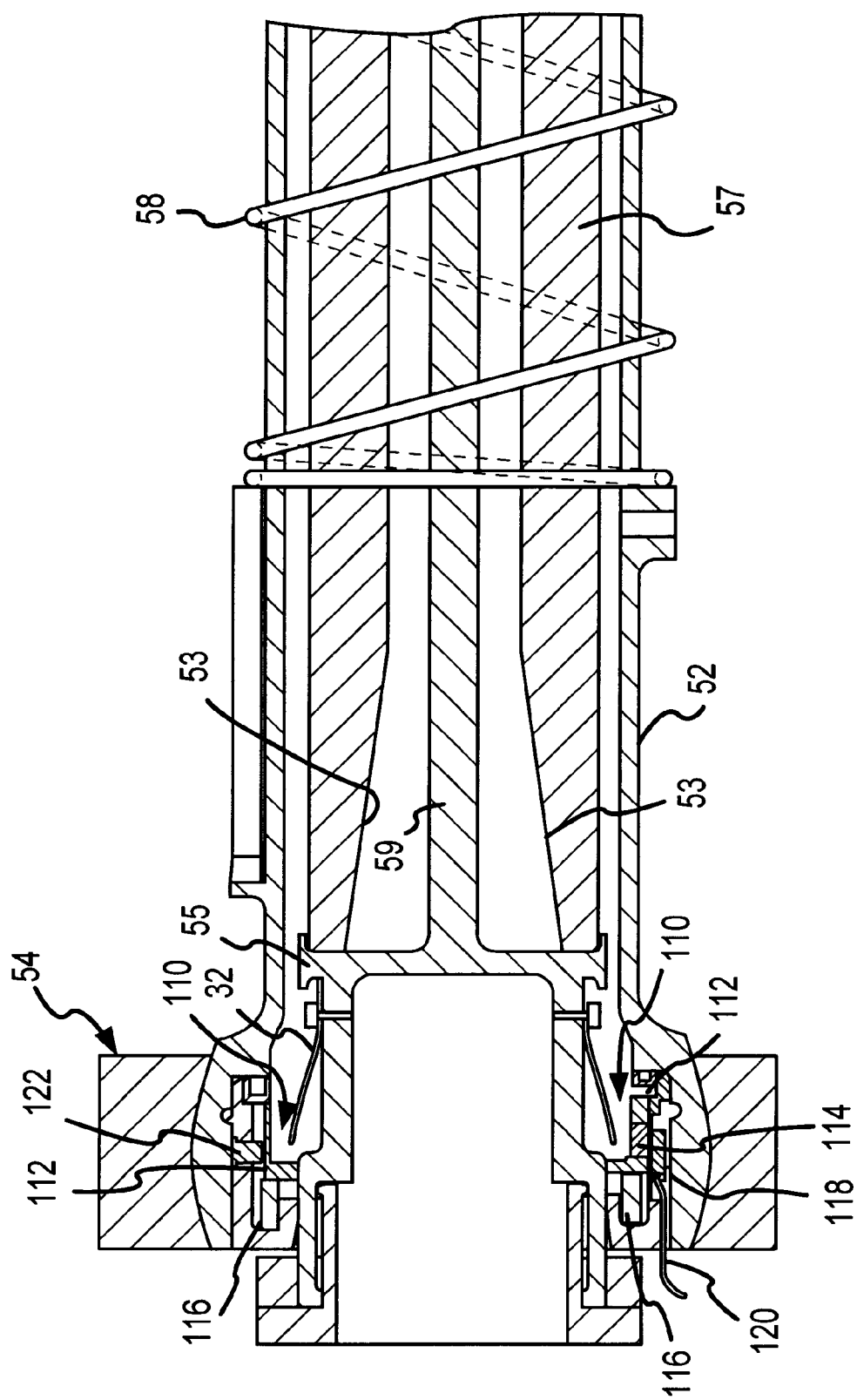
FIG. 3A is a cross-sectional view of part of the main leg assembly from one of the landing leg assemblies from the spacecraft of FIG. 1A in the region of its associated spherical bearing assembly, and with the main leg assembly being in a deployed position but prior to engagement with a planetary surface.

The main leg assembly 50 will now be further described with additional reference to FIG. 3A, which illustrates a cross-sectional view of the top end of a main leg assembly 50 in a fully deployed and "latched" position. More particularly, the top end of the main leg assembly 50 includes a support member 55 having a guide rod portion 59 that extends through the crushable portion 57. In the later regard, the crushable portion 57 is internally tapered along surface 53 to provide for gradual ramping-up of impact load absorption. An annular latch spring 32 is connected to the top end of support member 55, wherein the free end of the latch spring 32 is resiliently loaded to spring outward. In this regard, it is noted that when the lander leg assembly 40 is fully deployed prior to touchdown, the latch spring 32 will have sprung outward and axially "over-traveled" (i.e., to be spaced from) a sensing assembly 110 positioned within the spherical bearing assembly 54. Sensor assembly 110 may be provided to provide sensing signals upon touch-down and thereby facilitate selective control over the operation of landing thrusters 20.

Figure 3B:
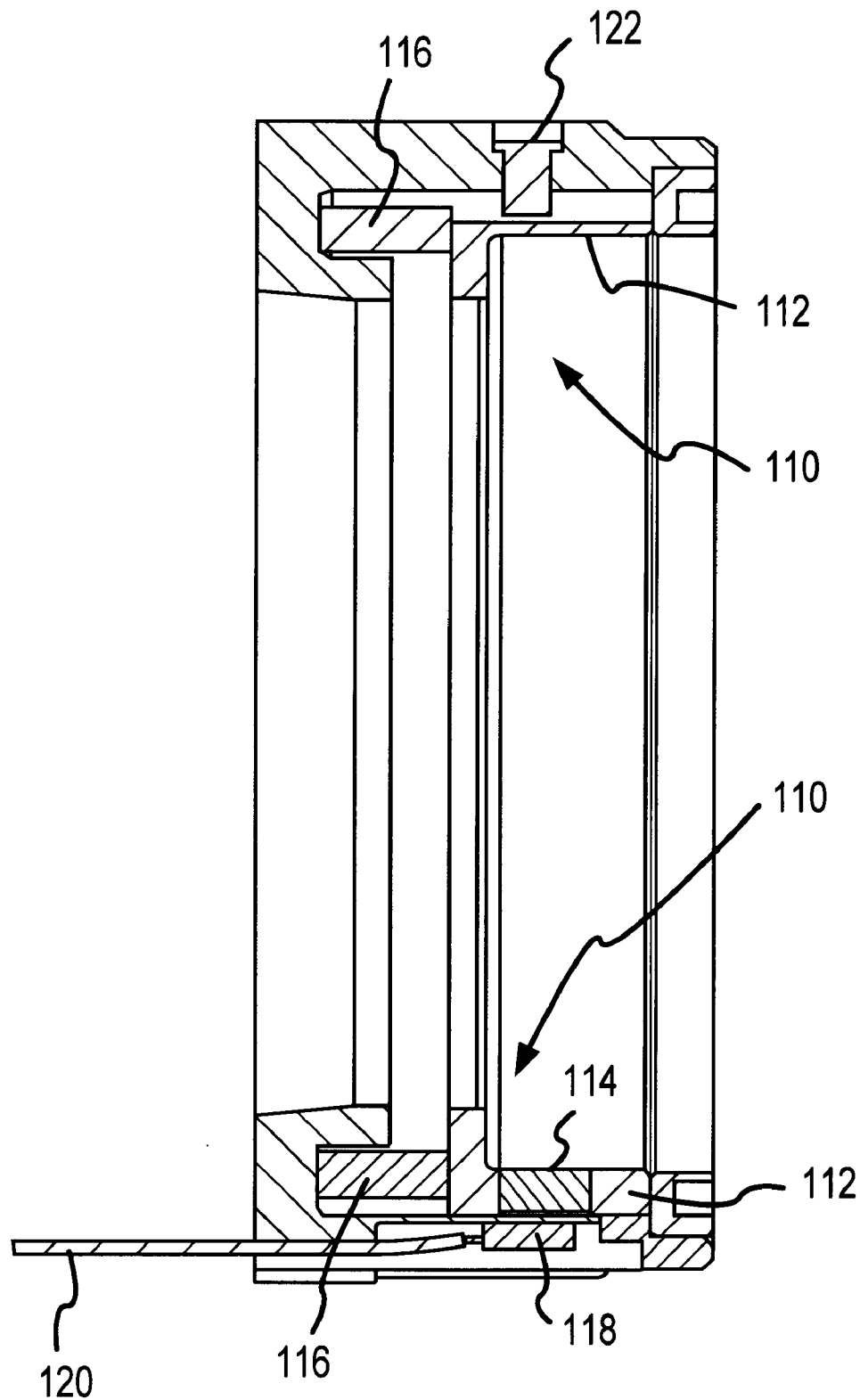
FIG. 3B a cross-sectional view of a sensor assembly used by the main leg assembly illustrated in FIG. 3A.

FIG. 3B illustrates an enlarged cross-sectional view of the sensor assembly 110. With reference to both FIG. 3A and FIG. 3B, sensor assembly 110 comprises an annular slider member 112 that may slide axially, a magnet 114 carried by slider member 112, an annular wave spring 116 positioned in contact relation with the slider member 112, and a Hall effect sensor 118 interfacing with the magnet 114 so as to provide an electrical output via line 120. Such output reflects the positional relationship between the Hall effect sensor 118 and the magnet 114. Upon landing, the main leg 56 will be forced upward thereby causing latch member 32 to engage slide member 112. Slide member 112 will in turn be forced against wave spring 116 and will move axially against the resilient force of wave spring 116. Concomitantly, the magnet 114 carried by slider 112 will be moved axially relative to the Hall effect sensor 118 so as to affect a responsive signal. In order to maintain the proper orientation of the slide member 112 within the spherical bearing assembly 54, slide member 112 may include a channel to receive a guide pin 122.

Figure 4A:
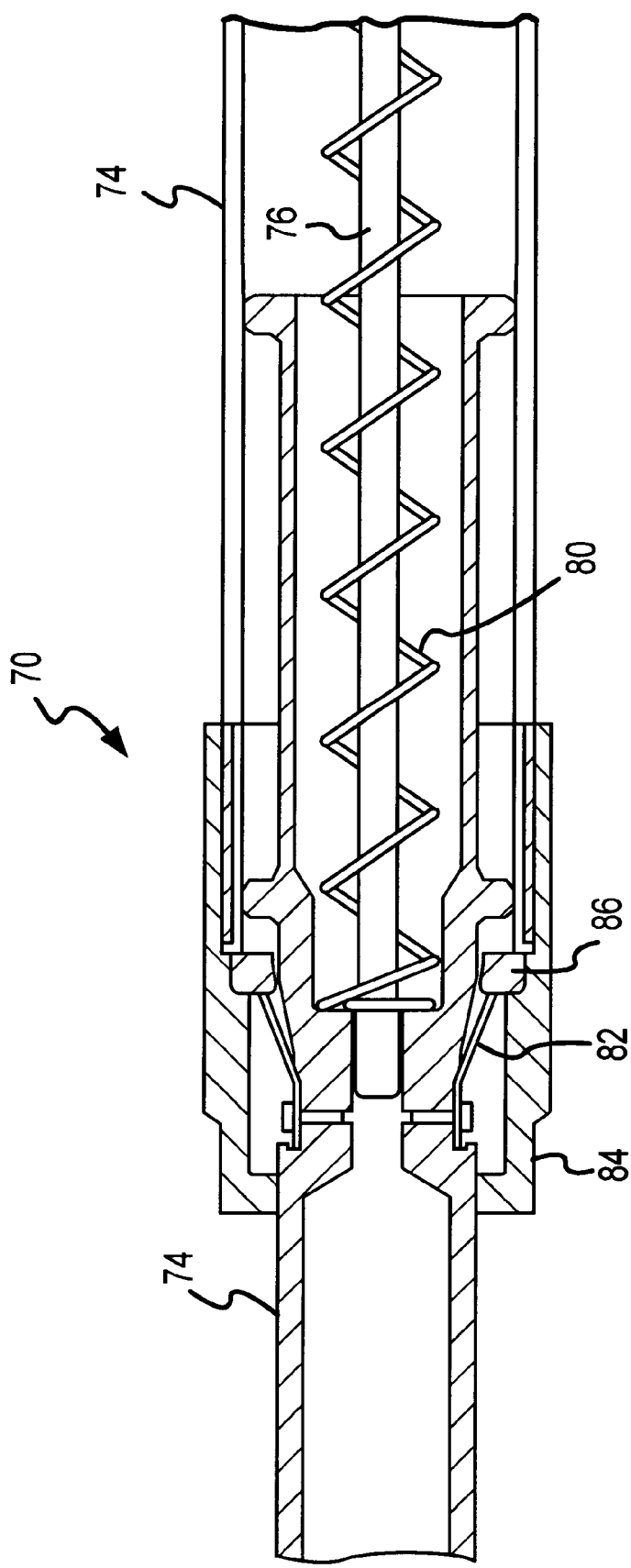
FIG. 4A is a cross-sectional view of one of the stabilizer leg assemblies for one of the landing leg assemblies used by the spacecraft of FIG. 1A and in its fully deployed position.
Figure 4B:
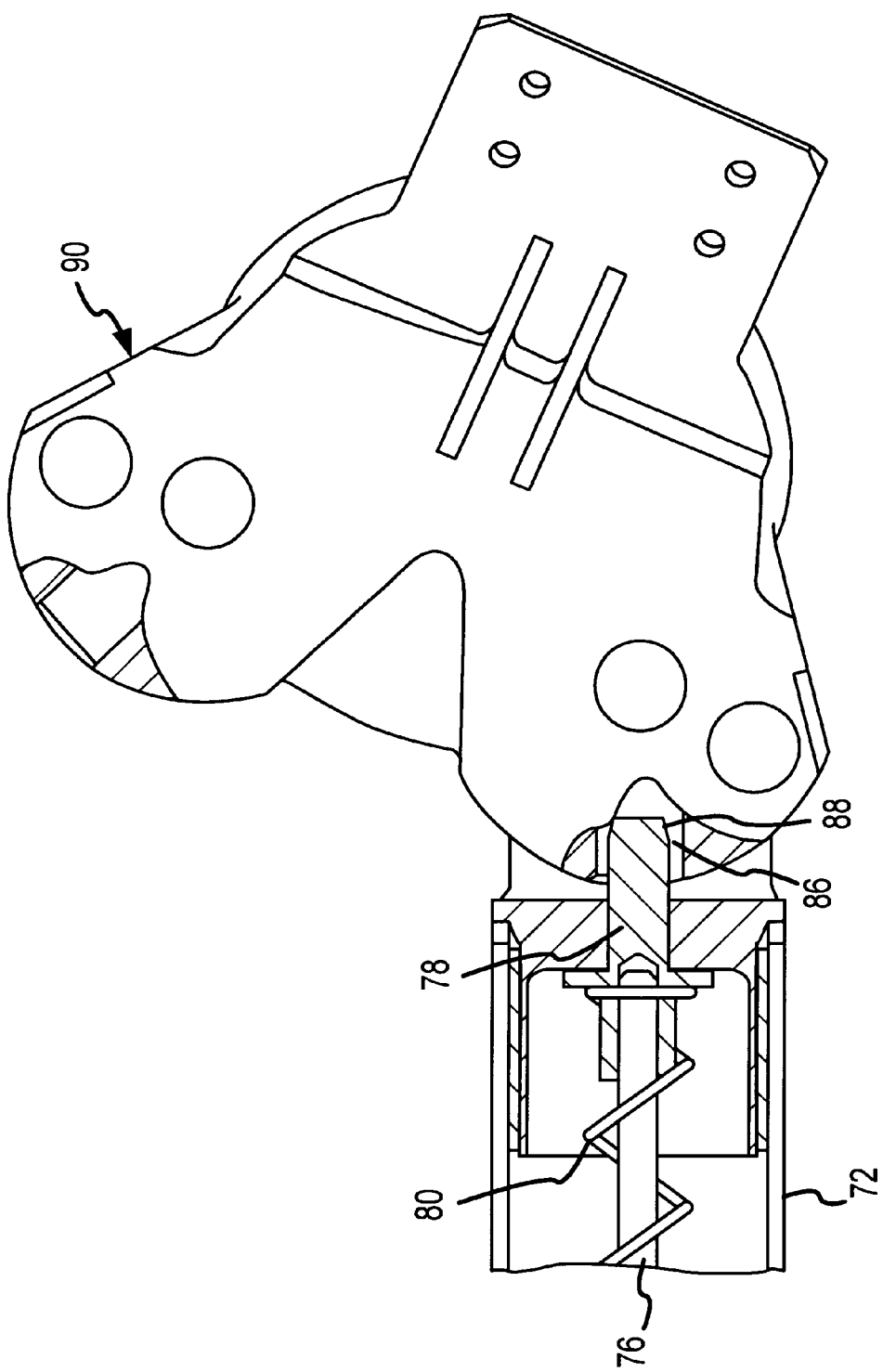
FIG. 4B is a view showing the interface between one of the stabilizer leg assemblies and a foot pad assembly.
Figure 5A:
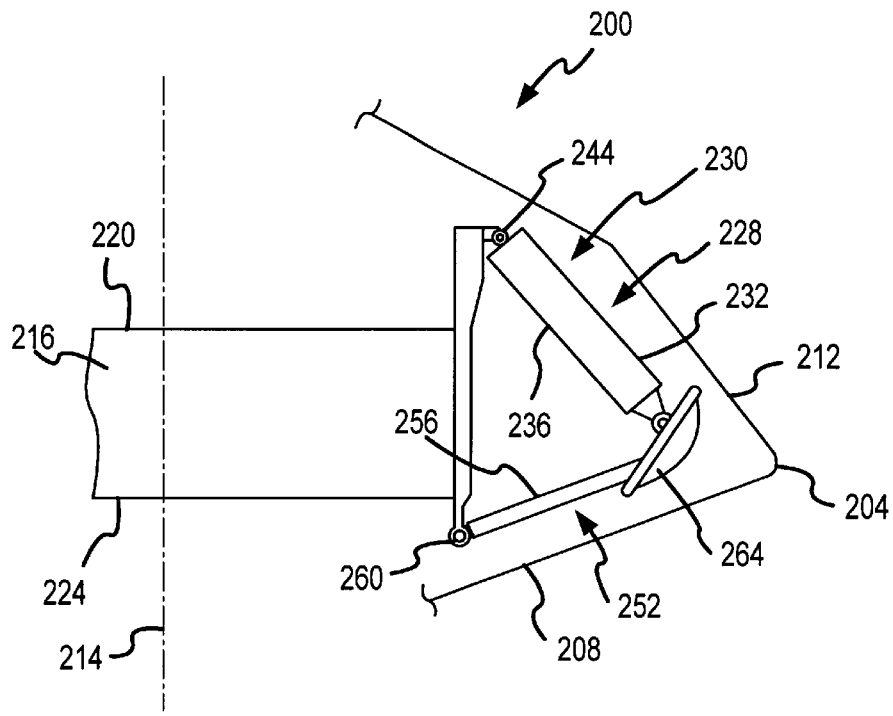
FIGS. 5A and 5B are views of a prior art landing gear system in a stowed and deployed position, respectively.
Figure 5B:
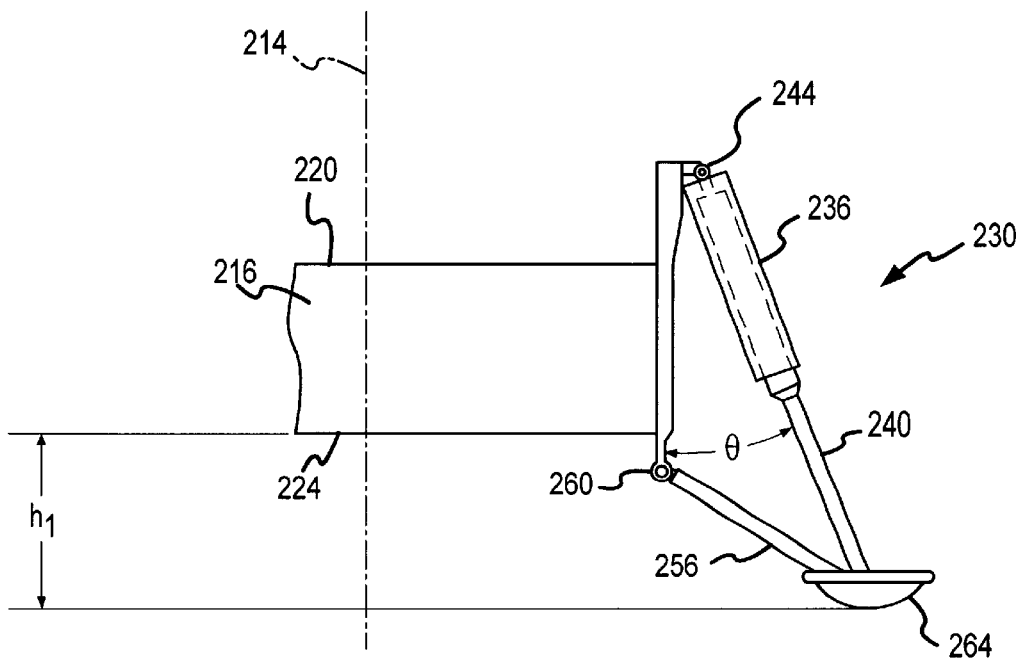

Stabilizer leg assemblies 70 will now be further described with reference to FIGS. 4A and 4B. FIG. 4A illustrates a cross-sectional view of the top end of a lower tube member 72 and the bottom end of a corresponding upper tube member 74 in a deployed and "latched" position. FIG. 4B illustrates a cross-sectional view of the lower tube member 72 interfacing with a corresponding foot assembly 90 after deployment.

With reference to both FIGS. 4A and 4B, it can be seen that stabilizer leg assembly 70 further comprises an internal guide rod 76 that is interconnected at a bottom end to the bottom end of lower tube 72 via a latch pin 78 (see FIG. 4B) and fitting assembly, and that is slidably received at its upper end within the upper tube 74 (see FIG. 4A). Additionally, a deployment, or compression spring 80 is provided about guide rod 76 for applying a resilient force to cause lower tube 72 to telescope downwardly over upper tube 74 upon deployment of the lander leg assembly 40.

Upon full deployment, FIG. 4A illustrates that a latch spring 82, interconnected to upper tube 74, will resiliently spring outward and "latch" against an inwardly projecting ledge member of guide member 84, thereby retaining the stabilizer leg assembly 70 in the deployed position. With particular reference to FIG. 4B, it should be noted that latch pin may be initially positioned during stowage immediately adjacent to the mouth of a receiving aperture 86 provided in foot assembly 90. In conjunction with deployment and landing, the beveled end 88 of the latch pin 78 may then be forced into the aperture 86.

The overall operation of a lander leg assembly 40 will now be described. During stowage, the deployment spring 58 of the main leg assembly, as well as the deployment springs 80 of each stabilizer leg assembly 70, are in a loaded, compressed state. Such state position is maintained via the interconnection of the separation nut assembly 66 to the bottom end of the main leg assembly 50. Upon selectively disengaging the separation nut assembly 66, the compression spring 58 of the main leg assembly 50 will cause the main leg 56 to be drawn downwardly through the spherical bearing assembly 54. Concurrently, the compression springs 80 of the stabilizer leg assemblies 70 will force the lower tube 72 of each assembly to telescope downwardly over the corresponding upper tube 74. In conjunction with the noted movements, the foot assembly 90 will pivot relative to the assemblies 50 and 70, and the top end of assemblies 70 will pivot relative to brackets 100.

Of importance, it should be noted that the stroke length of the telescoping stabilizer leg assemblies 70 and the stroke length of the main leg assemblies 50 are established so that the support leg assemblies 70 will reach a latched position prior to the latching of the main leg assembly (i.e., 50). As such, during a first stage of deployment (i.e., prior to support leg assembly 70 latching), the main leg assembly 50 will maintain an initial, predetermined angular orientation (e.g., about 42° relative to vertical) as it travels along a linear, downward path. In this regard, bracket 64 will interface with support tube 52 (e.g., via a z-shaped key that slidably engages opposing keyways provided in tube 52 and bracket 64) to facilitate the maintenance of such orientation during the first stage. During a second stage of deployment (i.e., after support leg assemblies 70 have latched), the main leg assembly 50 will pivot (i.e., about the top ends of assemblies 70) from its initial, predetermined angular orientation to a fully deployed angular orientation (e.g., about 30° relative to vertical) as it continues to travel downward along an arcuate path. The pivotable motion of the main leg assembly 50 from the initial, predetermined angular orientation to the deployed angular orientation is accommodated by the use of the spherical bearing assembly 54. The noted first stage movement is indicated by "A" and the noted second stage movement is indicated by "B" in FIG. 2B.

Upon landing, each of the sensor assemblies 110 positioned within the lander leg assemblies 40 will provide signals responsive to the particular landing force encountered by the corresponding lander leg assembly 40. As noted, such responsive signals may be utilized to selectively control landing thrusters 20 to facilitate the desired landing orientation, etc.

In conjunction with landing, the crushable section 57 of each main leg assembly 50 will crush to absorb the loading impact as is desirable. Further, for stabilization purposes, the pin 78 at the bottom end of each support leg assembly 70 will advanced into the aperture 86 of the corresponding foot assembly 90. To accommodate uneven terrain, it will be further appreciated that each of the stabilizer leg assemblies 70 may communicate loads to deflection members 110, thereby causing the deflection members 110 to selectively bend in an arcuate manner.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A spacecraft, comprising:

a space travel vessel; and landing gear interconnected with said space travel vessel and comprising a first landing leg assembly, wherein said first landing leg assembly comprises:

a first leg assembly which comprises first and second ends, wherein said first leg assembly is pivotally interconnected with said space travel vessel at a first location, wherein said first leg assembly further comprises first and second legs which are telescopingly interconnected with each other for an axial extension of said first leg assembly simultaneously with a pivoting of said first leg assembly relative to said space travel vessel about said first location during a deployment of said first landing leg assembly;

a second leg assembly which is disposed on a first side of said first leg assembly and which comprises first and second ends, wherein said second leg assembly is pivotally interconnected with said space travel vessel at a second location which is spaced from said first location, wherein said second end of said second leg assembly is pivotally interconnected with said first leg assembly, and wherein said second leg assembly comprises third and fourth legs which are telescopingly interconnected with each other for an axial extension of said second leg assembly simultaneously with a pivoting of said second leg assembly about said second location during said deployment of said first landing leg assembly; and a third leg assembly which is disposed on a second side of said first leg assembly which is opposite said first side and which comprises first and second ends, wherein said first end of said third leg assembly is pivotally interconnected with said space travel vessel at a third location which is spaced from said first location, wherein said second end of said third leg assembly is pivotally interconnected with said first leg assembly, wherein said third leg assembly comprises fifth and sixth legs which are telescopingly interconnected with each other for an axial extension of said third leg assembly simultaneously with a pivoting of said third leg assembly about said third location during said deployment of said first landing leg assembly, wherein said second and third leg assemblies stabilize said first leg assembly, and wherein said landing gear further comprises:

means for limiting a relative movement of said first leg assembly relative to said space travel vessel during a first portion of said deployment of said first landing leg assembly to said axial extension of said first leg assembly; and means for providing both said axial extension of said first leg assembly relative to said space travel vessel and said pivoting of said first leg assembly relative to said space travel vessel in a second portion of said deployment of said first leg assembly which is after said first portion of said deployment of said first leg assembly.

2. A spacecraft, as claimed in claim 1, further comprising:

three of said first landing leg assemblies at least substantially equally spaced about said space travel vessel.

3. A spacecraft, as claimed in claim 1, wherein:

one of said first and second legs of said first leg assembly extends within and slidably interfaces with the other of said first and second legs.

4. A spacecraft, as claimed in claim 1, wherein:

said landing gear further comprises a first pivotal connector between said space travel vessel and said first leg assembly.

5. A spacecraft, as claimed in claim 4, wherein:

said first pivotal connector comprises a spherical bearing assembly.

6. A spacecraft, as claimed in claim 4, wherein:

said first pivotal connector interfaces with an intermediate portion of said first leg assembly prior to said deployment of said first landing leg assembly.

7. A spacecraft, as claimed in claim 4, wherein:

said first leg assembly is movable from a stowed position where said first leg assembly is retained within said space travel vessel, to a deployed position where at least a portion of said first leg assembly extends beyond said space travel vessel, wherein said second end of said first leg assembly is interconnected with a landing foot assembly, wherein when said first leg assembly is disposed in said stowed position, said first pivotal connector interfaces with a portion of said first leg assembly which is disposed closer to said second end of said first leg assembly than said first end of said first leg assembly.

8. A spacecraft, as claimed in claim 4, wherein:

said first leg directly interfaces said first pivotal connector;

said second leg comprises first and second ends, and further slidably interfaces with said first leg;

prior to said deployment of said first landing leg assembly, said first end of said second leg is disposed on a first side of said first pivotal connector and said second end of said second leg is disposed on a second side of said first pivotal connector which is directly opposite said first side; and during said deployment of said first landing leg assembly, said second leg is drawn through said first leg and said first pivotal connector to direct said first end of said second leg at least initially towards said first pivotal connector and to direct said second end of said second leg away from said first pivotal connector.

9. A spacecraft, as claimed in claim 8, wherein:

said first pivotal connector comprises a spherical bearing.

10. A spacecraft, as claimed in claim 8, wherein:

said landing gear further comprises a biasing member comprising first and second ends, said first end of said biasing member being fixed relative to at least one of said first pivotal connector and said first leg, said second end of said biasing member being fixed relative to a portion of said second leg on said second side of said pivotal connector, and said biasing member being in compression prior to said deployment of said first landing leg assembly.

11. A spacecraft, as claimed in claim 8, wherein:

said landing gear further comprises a landing foot assembly interconnected with said second end of said second leg.

12. A spacecraft, as claimed in claim 11, wherein:

said landing foot assembly is pivotally interconnected with said second end of said second leg.

13. A spacecraft, as claimed in claim 1, wherein:

said landing gear further comprises a first biasing member comprising first and second ends, said first end of said first biasing member being fixed relative to said first leg and said second end of said first biasing member being fixed relative to said second leg, said first biasing member being under compression prior to said deployment of said first landing leg assembly.

14. A spacecraft, as claimed in claim 1, wherein:

said first landing leg assembly further comprises a deployment drive system, wherein said deployment drive system consists of a compression spring.

15. A spacecraft, as claimed in claim 1, wherein:

when said first landing leg assembly is deployed, a first end of said second leg is disposed within said first leg and a second end of said second leg is disposed beyond said first leg, wherein said second leg comprises a crushable section, and wherein a wall thickness of at least a portion of said crushable section of said second leg increases progressing toward said second end of said second leg.

16. A spacecraft, as claimed in claim 1, further comprising:

a first latch establishing a fixed relative positional relationship between said first and second legs of said first leg assembly after said deployment of said first landing leg assembly.

17. A spacecraft, as claimed in claim 1, further comprising:

a sensor assembly comprising first and second parts, said first part being maintained in a fixed position relative to said second leg, said second part being movable in response to movement of said second leg relative to said first leg upon engagement with a planetary surface; and at least one thruster operatively interconnected with said sensor assembly.

18. A spacecraft, as claimed in claim 1, wherein:

one of said third and fourth legs of said second leg assembly extends within and slidably interfaces with the other of said third and fourth legs.

19. A spacecraft, as claimed in claim 1, wherein:

said landing gear further comprises a second pivotal connector between said space travel vessel and said second leg assembly.

20. A spacecraft, as claimed in claim 1, wherein:

said landing gear further comprises a biasing member comprising first and second ends, said first end of said biasing member being fixed relative to one of said third and fourth legs, said second end of said biasing member being fixed relative to the other of said third and fourth legs, said biasing member being in compression prior to said deployment of said first landing leg assembly.

21. A spacecraft, as claimed in claim 1, wherein:

said fourth leg slidably interfaces with said third leg and defines a distal end of said second leg assembly.

22. A spacecraft, as claimed in claim 21, wherein:

said landing gear further comprises a landing foot assembly pivotally interconnected with said fourth leg of said second leg assembly.

23. A spacecraft, as claimed in claim 1, wherein:

said landing gear further comprises a latch establishing a fixed relative positional relationship between said third and fourth legs of said second leg assembly after a deployment of said second leg assembly.

24. A spacecraft, as claimed in claim 1, wherein:

said landing gear further comprises first and second latches associated with said first and second leg assemblies, respectively, and activated when said first and second leg assemblies, respectively, are deployed, wherein said second latch is activated before said first latch.

25. A spacecraft, as claimed in claim 1, wherein:

said landing gear further comprises a first biasing member comprising first and second ends, said first end of said biasing member being fixed relative to at least one of a first pivotal connector and said first leg, said first pivotal connector being at said first location and pivotally interconnecting said first leg assembly with said space travel vessel, said second end of said biasing member being fixed relative to a portion of said second leg, and said biasing member being in compression prior to said deployment of said first landing leg assembly; and said landing gear further comprises a second biasing member comprising first and second ends, said first end of said second biasing member being fixed relative to one of said third and fourth legs, said second end of said second biasing member being fixed relative to the other of said third and fourth legs, said second biasing member being in compression prior to said deployment of said first landing leg assembly.

26. A spacecraft, as claimed in claim 1, wherein:

said landing gear further comprises a first pivotal connector between said space travel vessel and said first leg assembly, said first pivotal connector comprising a spherical bearing assembly;

said landing gear further comprises a second pivotal connector between said space travel vessel and said second leg assembly;

said first leg of said first leg assembly directly interfaces with said first pivotal connector;

said second leg of said first leg assembly comprises first and second ends, and further slidably interfaces with said first leg;

prior to said deployment of said first landing leg assembly, said first end of said second leg is disposed on a first side of said first pivotal connector and said second end of said second leg is disposed on a second side of said first pivotal connector which is directly opposite said first side;

said landing gear further comprises a first biasing member comprising first and second ends, said first end of said first biasing member being fixed relative to at least one of said first pivotal connector and said first leg, said second end of said first biasing member being fixed relative to a portion of said second leg on said second side of said pivotal connector, and said biasing member being in compression prior to said deployment of said first landing leg assembly;

one of said third and fourth legs of said second leg assembly slidably interfaces with the other of said third and fourth legs;

said landing gear further comprises a second biasing member comprising first and second ends, said first end of said second biasing member being fixed relative to one of said third and fourth legs, said second end of said second biasing member being fixed relative to the other of said third and fourth legs, said second biasing member being in compression prior to said deployment of said first landing leg assembly; and said landing gear further comprises first and second latches associated with said first and second leg assemblies, respectively, wherein said second latch is activated before said first latch.

27. A method for deploying landing gear from a space travel vessel of a spacecraft, said landing gear comprising a first leg assembly which is interconnected with said space travel vessel, wherein said first leg assembly comprises first and second ends, wherein said second end is opposite said first end and defines a distal end of said first leg assembly, wherein said method comprises the steps of:

executing a first extending step comprising extending said first leg assembly;

using only substantially linear relative movement between first leg assembly and said space travel vessel during a first portion of said executing a first extending step; and executing a first pivoting step comprising pivoting said first leg assembly relative to said space travel vessel, wherein said executing a first pivoting step comprises directing said second end at least generally toward a position which is under said space travel vessel, and wherein said executing a first pivoting step is executed only during a second portion of said executing a first extending step immediately following said first portion of said executing a first extending step, wherein said first and second portions are non-overlapping.

28. A method, as claimed in claim 27, wherein:

said executing a first extending step comprises directing said first leg assembly through a spherical bearing assembly.

29. A method, as claimed in claim 27, wherein:

said executing a first extending step comprises using a biasing member.

30. A method, as claimed in claim 27, further comprising the steps of:

sensing a position of said first leg assembly during said executing a first extending step; and activating at least one thruster associated with said spacecraft based upon said sensing step.

31. A method, as claimed in claim 27, wherein:

said landing gear further comprises a second leg assembly which is interconnected with said space travel vessel at a location which is displaced from where said first leg assembly is interconnected with said space travel vessel, wherein said second leg assembly is also interconnected with said first leg assembly, and wherein said method further comprises the step of executing a second extending step comprising extending said second leg assembly during at least a portion of said executing a first extending step.

32. A method, as claimed in claim 31, wherein:

said executing a second extending step is executed only during said first portion of said executing a first extending step.

33. A method, as claimed in claim 31, wherein:

said executing a second extending step comprises using a biasing member.

34. A method, as claimed in claim 31, further comprising the steps of:

executing a first terminating step comprising terminating said executing a first extending step; and executing a second terminating step comprising terminating said executing a second extending step, wherein said executing a second terminating step is executed prior to said executing a first terminating step.

35. A method, as claimed in claim 31, further comprising the step of:

terminating said executing a second extending step, wherein said executing a first pivoting step is executed only after execution of said terminating step.

36. A method, as claimed in claim 31, further comprising the step of:

executing a first latching step comprising latching said first leg assembly after said executing a first extending step;

executing a second latching step comprising latching said second leg assembly after said executing a second extending step, wherein said executing a first latching step is executed after said executing a second latching step.

37. A method, as claimed in claim 31, further comprising the step of:

executing a second pivoting step comprising pivoting said second leg assembly relative to said space travel vessel throughout at least substantially an entirety of said executing a first extending step.

* * * * *